United States Patent
Toohey

(10) Patent No.: US 6,658,433 B1
(45) Date of Patent: *Dec. 2, 2003

(54) METHOD AND MECHANISM FOR DURATION-BASED MANAGEMENT OF TEMPORARY LOBS

(75) Inventor: Rosanne Park Toohey, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/133,612

(22) Filed: Apr. 25, 2002

Related U.S. Application Data

(63) Continuation of application No. 09/322,253, filed on May 28, 1999, now Pat. No. 6,418,454.

(51) Int. Cl.[7] .......................... G06F 12/00; G06F 17/30
(52) U.S. Cl. .................................... 707/201; 707/104.1
(58) Field of Search ................................ 707/100, 104, 707/201, 205, 206, 103, 202, 203, 204

(56) References Cited

U.S. PATENT DOCUMENTS

| | | | |
|---|---|---|---|
| 5,136,706 A | 8/1992 | Courts | 707/206 |
| 5,560,003 A | 9/1996 | Nilsen et al. | 707/206 |
| 5,649,139 A | 7/1997 | Weinreb et al. | 711/202 |
| 5,742,793 A | 4/1998 | Sturges et al. | 711/155 |
| 5,822,590 A | 10/1998 | Gupta | 717/116 |
| 5,838,977 A | 11/1998 | Gupta | 717/156 |
| 5,873,105 A | 2/1999 | Tremblay et al. | 707/206 |
| 6,047,280 A | 4/2000 | Ashby et al. | 707/2 |
| 6,056,020 A | 5/2000 | Malone | 138/155 |
| 6,065,020 A * | 5/2000 | Dussud | 707/206 |
| 6,209,003 B1 | 3/2001 | Mattis et al. | 707/206 |
| 6,253,226 B1 * | 6/2001 | Chidambaran et al. | 709/104 |
| 6,275,857 B1 * | 8/2001 | McCartney | 709/226 |
| 6,314,435 B1 * | 11/2001 | Wollrath et al. | 707/206 |
| 6,418,454 B1 * | 7/2002 | Toohey | 707/201 |

* cited by examiner

Primary Examiner—Greta Robinson
Assistant Examiner—Susan Ruyyan
(74) Attorney, Agent, or Firm—Bingham McCutchen LLP

(57) ABSTRACT

Disclosed is a method and mechanism for duration-based management of temporary large objects ("LOBs") in a database system. According to one aspect, temporary LOBs are associated with a duration having a lifespan that corresponds to the lifespan of the temporary LOBs. When the duration ends, the associated temporary LOBs, and any resources allocated to the temporary LOBs, are automatically released. According to another aspect, multiple durations of varying, and possibly overlapping lifespans, can exist in the database system. According to yet another aspect, a tree of durations can be created having multiple ancestor and descendant durations.

21 Claims, 9 Drawing Sheets

METHOD AND MECHANISM FOR DURATION-BASED MANAGEMENT OF TEMPORARY LOBS

CROSS-REFERENCE TO RELATED APPLICATION

This application is a continuation of U.S. application Ser. No. 09/322,253, filed May 28, 1999, now U.S. Pat. No. 6,418,454, which is hereby incorporated by reference in its entirety for all purposes as if fully set forth herein.

BACKGROUND OF THE INVENTION

1. Field of the Invention

The invention relates to computer systems, and more particularly to the management of large objects (hereinafter "LOB" or "LOBs") in a database system.

2. Background

LOB datatypes are used in a database system to store large blocks of structured or unstructured data, e.g., text, video, sound, or images. LOBs can be defined to contain any kind of data, including binary data, single-byte character set data, or multi-byte character set data. LOBs can be stored in memory structures defined within the database or external to the database in operating system files.

"Temporary LOBs" are LOB datatypes that are implemented for non-persistent usage. A temporary LOB is normally created with the expectation that it is to have a limited lifetime of existence, in which the temporary LOB and all of its associated resources are to be deleted or deallocated at the end of its lifetime.

Each temporary LOB is normally allocated a set of data pages or data blocks to store the LOB data. To track the memory/storage location of the temporary LOB, a system pointer or "locator" is maintained that contains the address of one or more of the data pages for the temporary LOB. Index entries may also be maintained to index the contents or the data pages of the temporary LOB. Depending upon the specific purposes for which the temporary LOB is utilized, additional resources or data structures may also be allocated or associated with the temporary LOB.

When a temporary LOB is no longer needed or when it is at the end of its specified lifetime, the resources allocated to the temporary LOB should be deallocated or "freed" to allow re-use of those resources for other purposes. To perform deallocation of the temporary LOBs, the database system must track the existence and location of all temporary LOBs on the system, as well as any resources associated or allocated to the temporary LOBs.

One approach that can be used is to require a user to explicitly track each temporary LOB that has been created by or for that user. The user is given information regarding the pointers or locators for each temporary LOB associated with that user. Under this approach, temporary LOBs are freed by having users make explicit calls to deallocate unneeded LOBs. In this manner, a user can determine exactly when and under what circumstances a temporary LOB will be freed.

One drawback to this approach is that it places a great burden upon the user to track and verify that unneeded temporary LOBs and their resources are deallocated. If the user fails to diligently monitor for temporary LOBs that have exceeded intended lifespans, then excess resources are being consumed on the system. Moreover, since the user is making explicit calls to free each individual temporary LOB, if multiple temporary LOBs having the same lifespan must be freed at the same time, the user is nonetheless forced to repetitively make the same explicit calls for each temporary LOB. In addition, significant resources may have to be expended, both by the user and system, to track each individual temporary LOB on the system.

According to an alternate approach, temporary LOBs are automatically terminated when the database shuts down or when a user session ends. The advantage of this approach is that it does not depend upon the user to perform the explicit task of removing unneeded temporary LOBs. However, this approach allows very little control over the lifespans of individual temporary LOBs. Moreover, temporary LOBs that are unneeded prior to the end of the default lifespan will unnecessarily consume system resources.

Therefore, there is a need for an improved method and mechanism for maintaining, tracking, and freeing temporary LOBs in a database system.

SUMMARY OF THE INVENTION

The invention is directed to a method and mechanism for duration-based management of temporary LOBs in a database system. According to an aspect of the invention, temporary LOBs are associated with a duration having a lifespan that corresponds to the lifespan of the temporary LOBs. When the duration ends, the temporary LOBs and any resources allocated to the temporary LOBs are automatically released. According to another aspect of the invention, multiple durations of varying, and possibly overlapping lifespans, can exist in the database system. According to yet another aspect of the invention, a tree of durations can be created having multiple ancestor and descendant durations.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

FIG. 4 is a flowchart of an embodiment of a process for changing the duration that a temporary LOB is associated with.

DETAILED DESCRIPTION

The present invention is directed to duration-based management of temporary LOBs. A "duration" is a logical bucket having a designated lifespan period. When a duration reaches the end of its lifespan, the duration is terminated and any resources or data structures logically associated with the duration are released. Thus, any temporary LOBs that share a common anticipated lifespan period can be collected into a corresponding duration, and when the duration period is over, the temporary LOBs are automatically deallocated. This provides efficient group management over the deallocation of temporary LOBs and any resources associated with the temporary LOBs.

Multiple durations can be maintained on a system, in which the durations have different and possibly overlapping lifetimes. The circumstances that mark the end of a duration can be based upon any system criteria or event. For example, the duration time period can be based upon the state of a user's session or work in the database system. The duration time period can also be based upon a logical timer mechanism, in which a specified period of elapsed time or occurrence of a time value will trigger the termination of a duration. The duration end can also be event driven such that the duration has an indeterminate lifetime based upon the occurrence of a specified event. More details regarding details of durations and duration-based management of objects is described in U.S. application Ser. No. 09/103,547, entitled "Duration-Based Memory Management Of Complex Objects," filed Jun. 24, 1998, now U.S. Pat. No. 6,253,226, which is hereby incorporated by reference in its entirety for all purposes as if fully set forth herein.

According to an embodiment, each duration is associated with a duration state object. The duration state object contains information identifying temporary LOBs grouped within the duration, as well as information regarding termination parameters which affect the duration. One or more data structures can be used to track temporary LOBs grouped within the duration. For example, the duration state object could contain a hash table or linked list of LOB control structures to track temporary LOBs assigned to a duration. By creating a state object to hold duration information, the state object can be hung from any other state object. This is useful for implementing automatic cleanup of resources at the end of a duration. For the purposes of illustration only, and not by way of limitation, the present description is made in the context of memory/storage resources allocated to temporary LOBs, but the principles disclosed herein are equally applicable to other types of resources.

Figure 1:
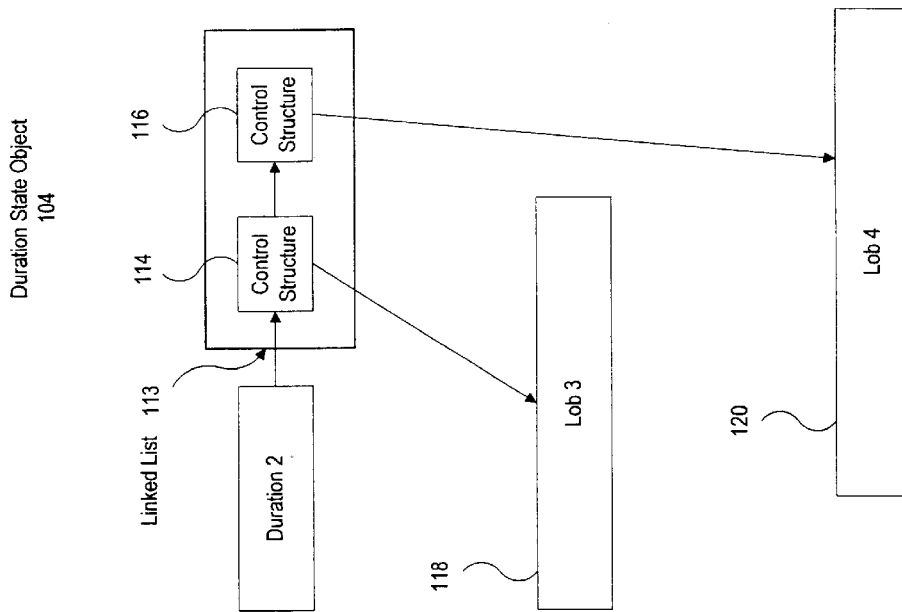
FIG. 1 depicts a system architecture for duration-based management of temporary LOBs according to an embodiment of the invention.
Figure 1:
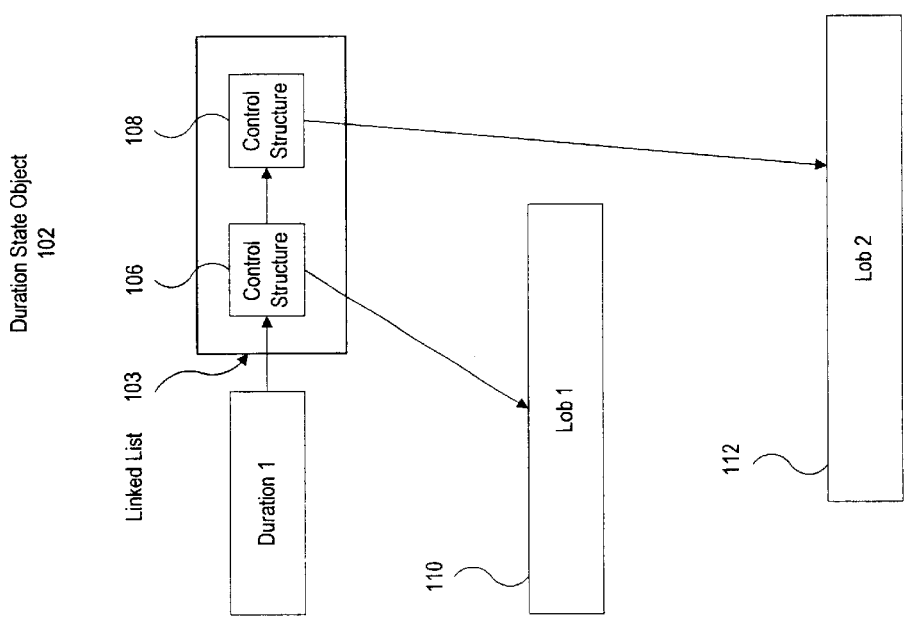

FIG. 1 depicts an architecture for representing duration-based management of temporary LOBs according to an embodiment of the invention. A first duration state object 102 includes a linked list 103 of LOB control structures, such as LOB control structures 106 and 108. Each LOB control structure on linked list 103 is associated with a temporary LOB that is assigned to the first duration. Thus, LOB control structure 106 is associated with temporary LOB 110 and LOB control structure 108 is associated with temporary LOB 112. Each LOB control structure in linked list 103 includes a pointer or locator containing the address of memory/storage location(s) for its associated temporary LOB.

A second duration state object 104 includes a linked list 113 of LOB control structures, such as control structures 114 and 116. Similar to the duration represented by duration state object 102, each LOB control structure on linked list 113 is associated with a temporary LOB that is assigned to the second duration. Thus, LOB control structure 114 is associated with temporary LOB 118 and LOB control structure 116 is associated with temporary LOB 120. Each LOB control structure 114 and 116 in linked list 113 contains a pointer or locator containing the address of memory/storage location(s) of temporary LOBs 118 and 120, respectively.

To access temporary LOB data, the linked list of control structures is followed until the appropriate temporary LOB control structure is found. The control structure supplies a pointer to the memory location of the temporary LOB data. That memory location is thereafter used to access the memory address of the stored data.

Note that in the approach of FIG. 1, the data blocks/pages for temporary LOBs are not necessarily allocated from a common set of memory resources. Thus, temporary LOB 110 may be allocated from a user's temporary tablespace while temporary LOB 112 may be allocated from the system's tablespace. To release memory resources allocated to a temporary LOB, the linked list of control structures 103 and 113 are followed to identify control structures for temporary LOBs to be released. Each control structure points to the memory resources to be deallocated upon the termination of the duration.

Figure 2:
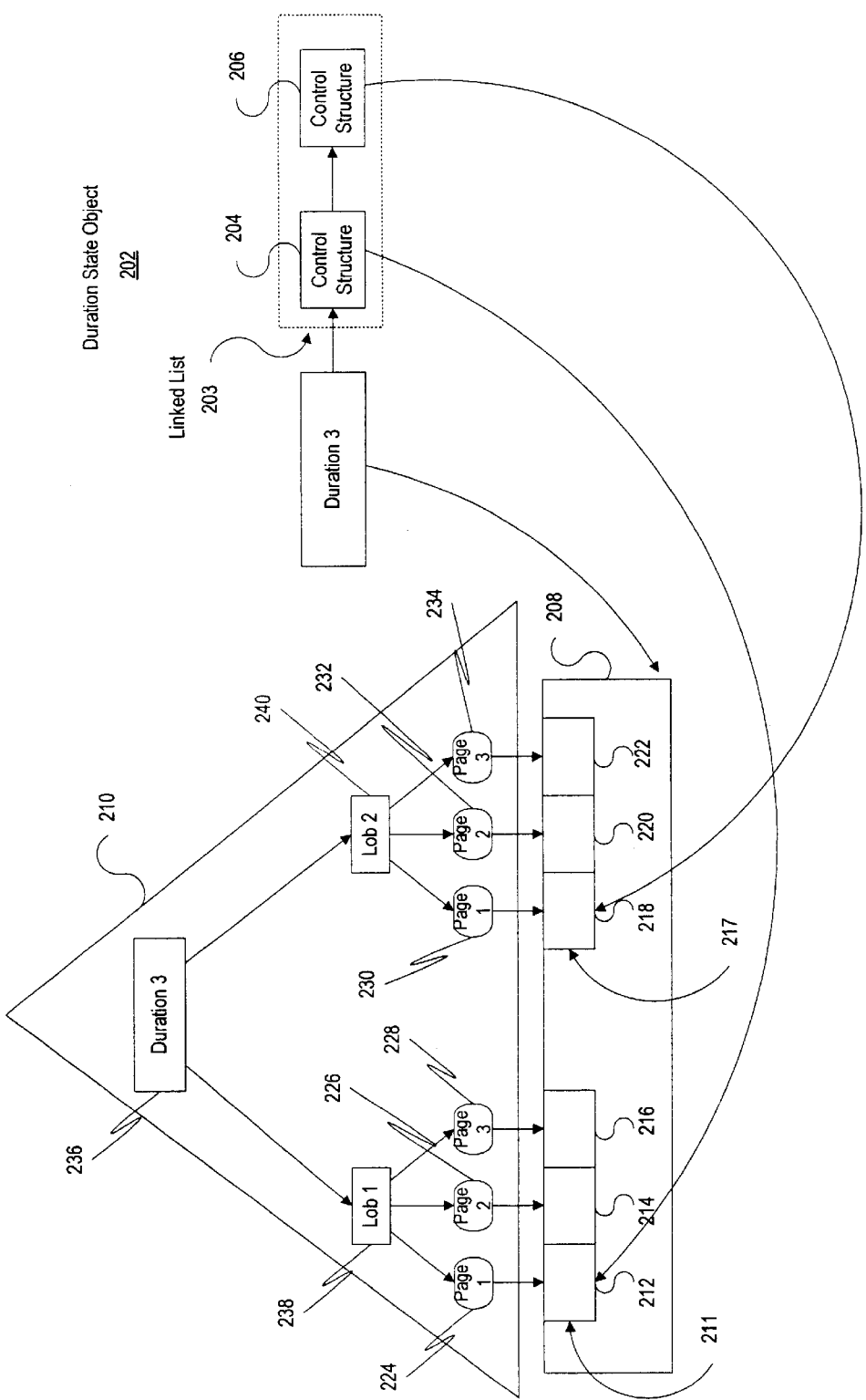
FIG. 2 depicts an alternate architecture for duration-based management of temporary LOBs.

In the approach illustrated in FIG. 2, each duration has its own set of memory resources from which data pages are allocated for all temporary LOBs associated with that duration. The common set of memory resources 208 can be a physically or logically contiguous section of memory. In the example of FIG. 2, duration state object 202 includes a linked list 203 of control structures 204 and 206 for the temporary LOBs that are associated with Duration_3. Control structure 204 includes a pointer to temporary LOB 211, which is allocated data pages 212, 214, and 216 in common memory resources 208. Control structure 206 includes a pointer to temporary LOB 217, which is allocated data pages 218, 220, and 222 in common memory resources 208.

In the approach of FIG. 2, all temporary LOB resources associated with a duration can be released by releasing the set of common resources allocated to the duration. Unlike the approach of FIG. 1, it is not required to follow the linked list of control structures to identify the resources to be freed for each temporary LOB.

An index can be created to index the temporary LOBs in a duration. In the embodiment shown in FIG. 2, all temporary LOBs for a particular duration are indexed within the same index tree 210. The index tree 210 contains a top-level node 236, which represents Duration_3. The top level node 236 points to a first LOB node 238 and a second LOB node 240. Each LOB node 238, 240 is associated with a LOB 211, 217 associated with Duration_3. The first LOB node 238 points to leaf nodes 224, 226, 228. The second LOB node 240 points to leaf nodes 230, 232, 234. The leaf nodes 224, 226, 228, 230, 232, 234 of index tree 210 point to the data pages 212, 214, 216, 218, 220, 222 of the temporary LOBs 211, 217 associated with Duration_3.

As stated above, multiple durations can coexist in the database system. Each duration is created with a specified "end" event, time, or circumstance that marks the termination point for the duration. The database system tracks the created durations, and when the specified end of a duration time period is detected, the duration and all of its associated temporary LOBs and resources are freed. The multiple durations may have overlapping lifespans, in which the end of one duration overlaps the lifetime of another duration. The following paragraphs set forth examples of different duration time periods that may be employed in an embodiment of the invention.

A "session" duration is created to have a time period that spans the life of a database connection or session. A database session normally commences when a user running a database application connects to a database server, which can be located on the same computer system as the database application or on another computer system in a distributed database system. The session duration terminates when either the user or the server terminates the connection to the database server.

A "transaction" duration is created to have a time period that spans the life of a transaction. A transaction is a sequence of database commands, e.g., Structured Query Language (SQL) statements, that share a common commit or that is treated as a single unit by the database system. The transaction duration normally terminates when the transaction is completed (as by a SQL "COMMIT" command) or aborted (as by a SQL "ROLLBACK" command).

A "call" duration is created to have a time period that spans the life of a client call. According to an embodiment, the life of a call duration is based on server-side events from the time a client call is sent to the server until the processing of the call completes. A call is an invocation of an operation in the database server. The call duration terminates when the call is completed.

According to an embodiment of the invention, a user (such as an application programmer) is permitted to create user-defined durations for very fine control over the lifetime of the duration. In this approach, when a duration is created, the user specifies an event, circumstance, or time period that is registered with the database system. The database system monitors for the occurrence of a registered end event for each duration. When a registered end event occurs, the corresponding duration and its associated resources are freed.

Essentially, any event can be used to "trigger" the end of a duration. The event-based or trigger-based duration can last an indeterminate time period, possibly lasting beyond a user session if the memory resources for the duration is allocated for the system tablespace as opposed to a user tablespace.

A duration may be associated with multiple termination events. The occurrence of any termination event associated with a duration ends the life of that duration. For example, a duration can be created to have the termination characteristics of both a session duration and a transaction duration. If either the session or transaction ends, then the duration will also end.

Figure 7:
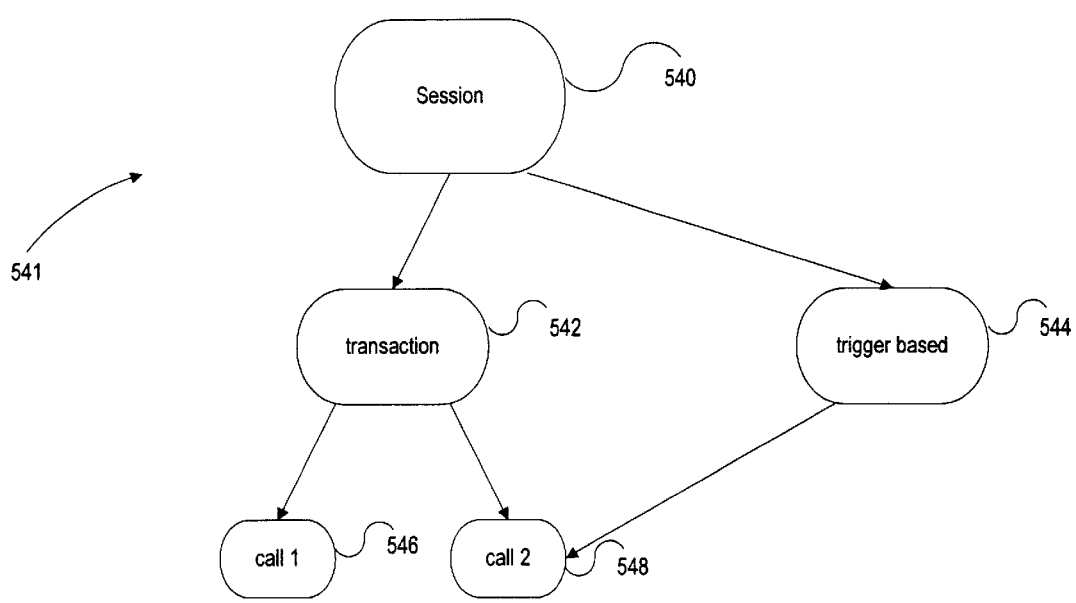
FIG. 7 depicts a tree of durations.

Multiple levels of nested durations can be employed in the invention. Each duration can be designated to have one or more "ancestor" or "descendant" durations. An ancestor duration can be a direct ancestor (i.e., a parent duration), as well as an indirect ancestor (e.g., grandparent or great-grandparent duration). Similarly, a descendant duration can be a direct descendant (i.e., a "child" duration), as well as an indirect descendant (e.g., grandchildren or great-grandchildren durations). When an ancestor duration terminates, then all descendant durations for that ancestor duration also terminate. Shown in FIG. 7 is an example of a tree 541 of nested durations. Session duration 540 is the logical ancestor of all other durations in the duration tree 541. When session duration 540 terminates, all other durations in duration tree 541 also terminate. Transaction duration 542 is the ancestor to call durations 546 and 548. If transaction duration 542 terminates, then both call durations 546 and 548 will also terminate. Trigger-based duration 544 is the ancestor of call duration 548. If trigger-based duration 544 ends, then call duration 548 also ends.

According to an embodiment, a duration may have multiple parent or direct ancestor durations. For example, call duration 548 has two direct ancestor durations—transaction duration 542 and trigger-based duration 544. If either direct ancestor duration terminates, then the descendent duration, i.e., call duration 548, also terminates. According to another embodiment, each descendent duration has only a single direct ancestor, although it may have multiple indirect ancestor durations (e.g., grandparent or great-grandparent durations).

Figure 3:
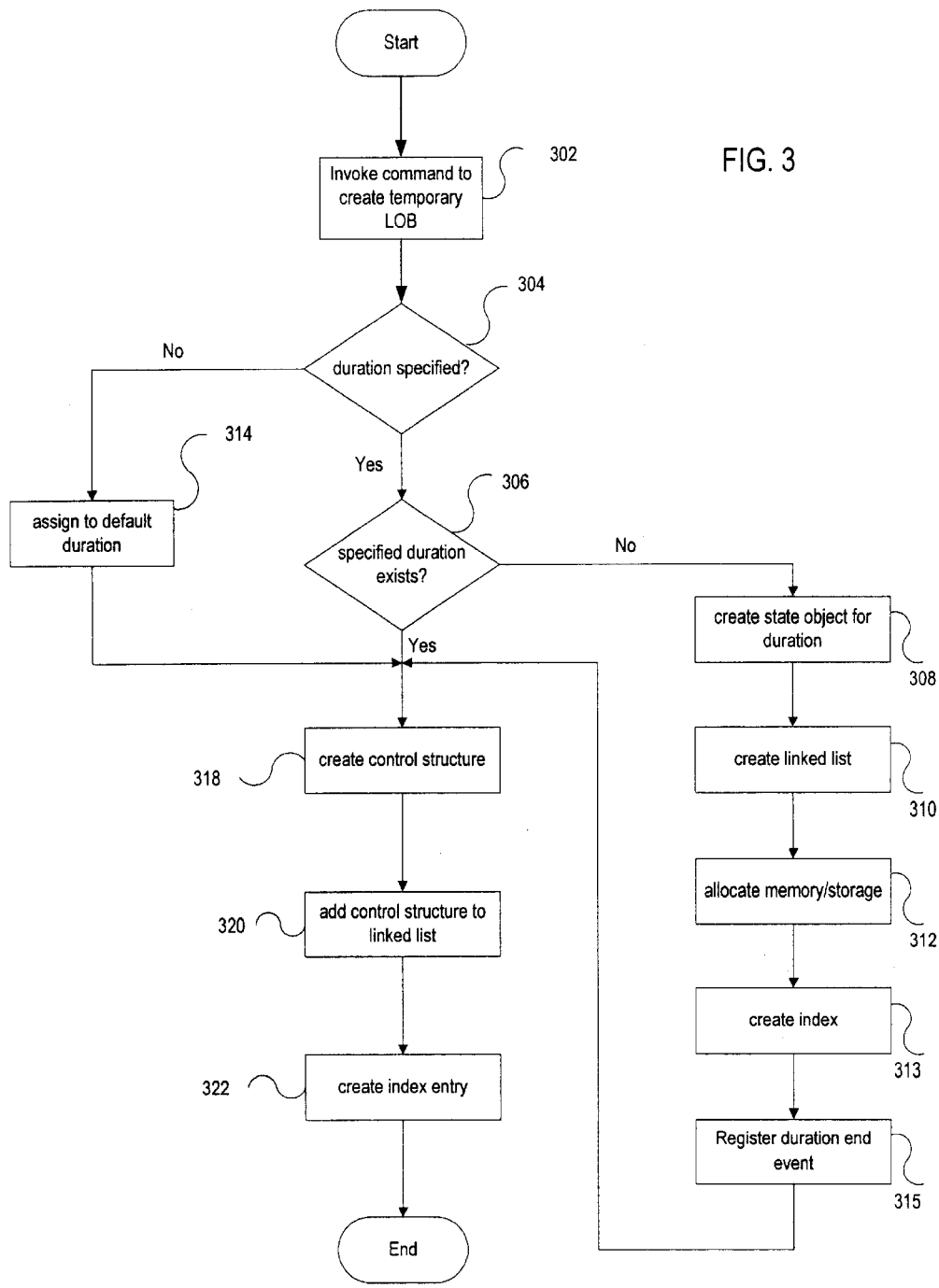
FIG. 3 is a flowchart of a process for allocating resources to a temporary LOB in a duration-based system according to an embodiment of the invention.

FIG. 3 illustrates a process for allocating resources to a temporary LOB according to an embodiment of the invention. The process initiates when a command is invoked to create a new temporary LOB (302). A test is performed to determine whether a duration has been specified for the new temporary LOB (304). According to an embodiment of the invention, a temporary LOB is assigned to a duration at the time it is created. If no duration is specified when the temporary LOB is created, then it is assigned to a default duration (314), and the process proceeds to process action 318. In the preferred embodiment of the invention, the default duration for a temporary LOB is the session duration.

If a duration is specified when the temporary LOB is created, then a test is performed to determine if the specified duration exists (306). If the specified duration does not exist, then the new named duration can be created (308-315). A new state object is created for the new duration (308), which preferably includes a linked list of control structures for the new duration (310). If the temporary LOBs for a duration are to inhabit a common set of memory resources for the duration, then a set of memory resources are allocated for the duration (312). If the temporary LOBs for the duration are to be indexed, then an index is created (313). The duration end event is then registered with the database system, and the system begins monitoring for the duration end event to occur (315).

A control structure is generated for the temporary LOB (318). The control structure includes information necessary for accessing the temporary LOB, such as a locator or pointer that identifies the location of specific data pages for the temporary LOB. The new control structure is then added to the linked list for the duration (320). If the temporary LOBs for the duration are indexed, then index entries are generated which point to the data pages containing the new temporary LOB (322).

In the preferred embodiment, data pages for a temporary LOB are not allocated until the temporary LOB data is ready to be written to memory. If the temporary LOBs for a duration are to inhabit a common set of resources, then data pages for the temporary LOB are allocated from the common resources for the duration. Otherwise, data pages can be allocated from any available memory in the system. According to an embodiment, a user is permitted to specify the allocation parameters. For example, the user can specify whether the memory resources are allocated from the user's temporary tablespace, or whether the resources are allocated from other system areas.

Figure 4:
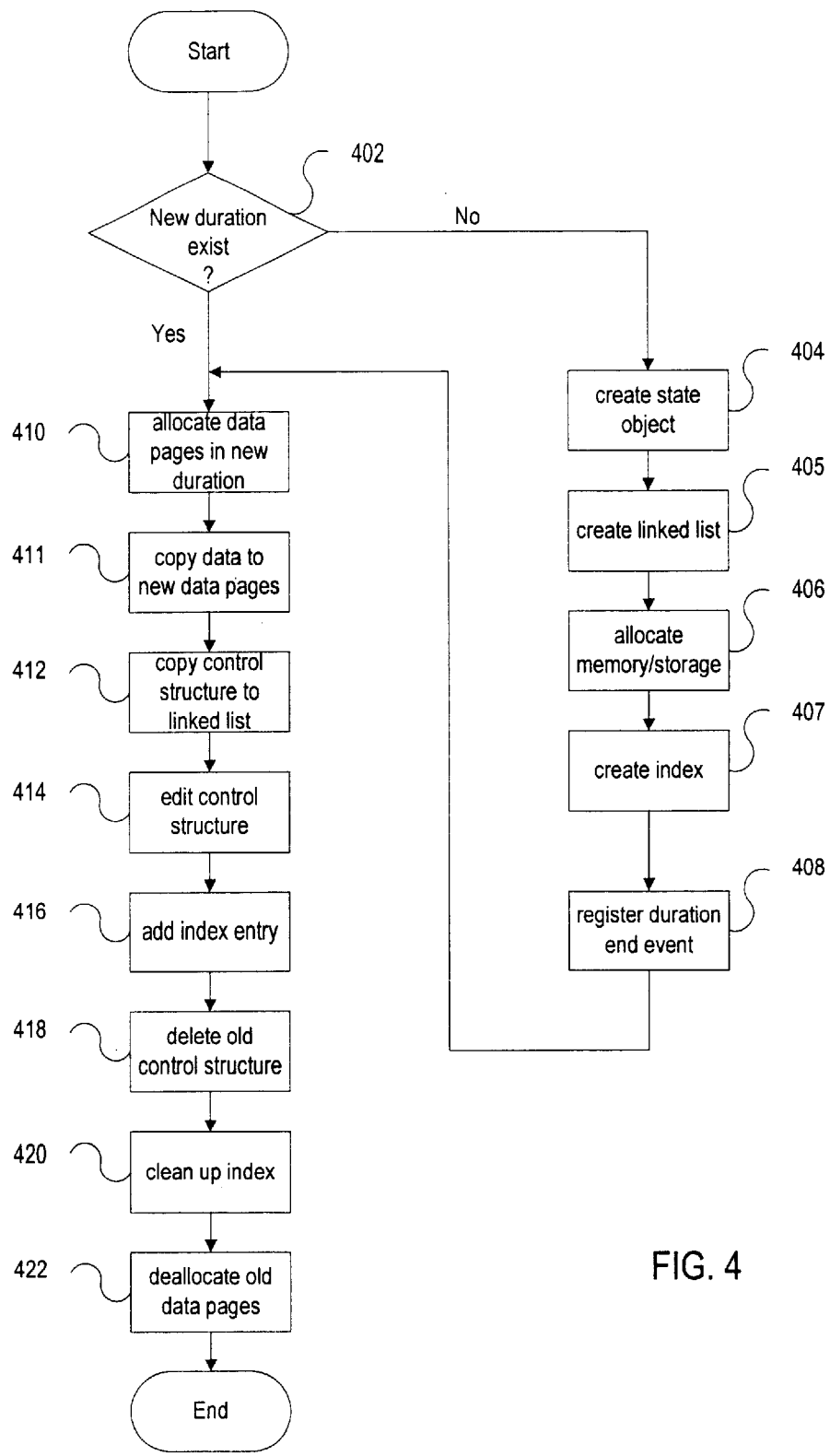

FIG. 4 illustrates a process for changing the duration that a temporary LOB is assigned to. This process can be used if a temporary LOB has already been assigned to a duration, but is to be reassigned to another duration.

At process action 402, a test is performed to determine if the specified duration exists. If the specified duration exists, then the process proceeds to process action 410. If the specified duration does not exist, then the new named duration can be created (404–408). A state object is created for the new named duration (404), which includes the generation of a linked list of control structures for the duration (405). If temporary LOBs for the new duration are to inhabit a common set of memory resources for the duration, then a set of memory resources are allocated for the duration (406). If the temporary LOBs for the duration are to be indexed, then an index is created (407). The duration end event is then registered with the database system, and the system begins monitoring for the event to occur (408).

Memory resources are allocated for the temporary LOB (410). If the temporary LOBs for a duration are to inhabit a common set of resources, then data pages for the temporary LOB are allocated from the common resources for the duration. Otherwise, data pages can be allocated from other sections of memory in the system, e.g., the user's temporary tablespace.

The data for the temporary LOB is copied from the data pages of the old duration to the new duration (411). The existing control structure for the temporary LOB is then copied to the linked list for the newly specified duration (412). The information in the control structure is modified to point to the new location of the data pages for the temporary LOB (414). If the temporary LOBs for the duration are indexed, then index entries are generated which point to the data pages containing the temporary LOB (416).

The information in the old duration is then cleaned up. The control structure in the old duration is then removed from the linked list for the old duration (418). In addition, any index entries for the temporary LOB in the old duration index are removed (420). Finally, the contents of the data pages from the old duration are removed (422).

Figure 5:
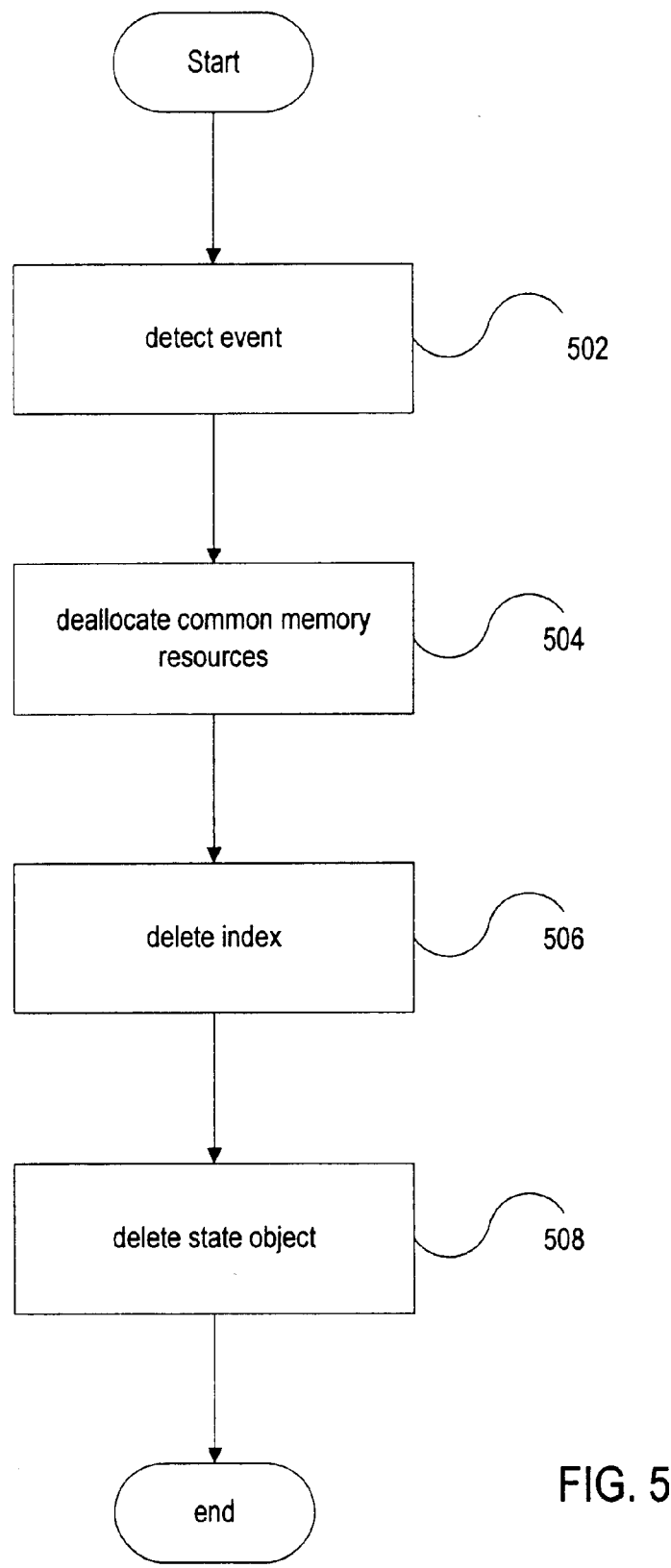
FIG. 5 is a flowchart of an embodiment of a process for deallocating resources associated with a temporary LOB.

FIG. 5 illustrates a flowchart of a process for deallocating resources associated with temporary LOBs according to an embodiment of the invention. The process illustrated in FIG. 5 is used if all the temporary LOBs associated with a duration have their data pages allocated from a common set of memory resources for the duration. At process action 502, an event is detected which indicates the end of the time period for a duration (502). When the event is detected, the entirety of the common memory resources for the duration is freed (504). Since all of the temporary LOBs associated with the duration have their data pages allocated from this common set of resources, all of the resources for the temporary LOBs are automatically freed by this action. If the temporary LOBs for the duration are indexed, then the temporary LOB index is deleted (506). Finally, the state object for the duration is removed (508). This includes any elements of the duration state object, such as the linked list of control structures. According to an embodiment, LOB control structures for a duration are allocated from a common heap. To release the LOB control structures, the entire heap can be released all at once. Alternatively, the linked list of LOB control structures can be walked to release each LOB control structure individually.

Figure 6:
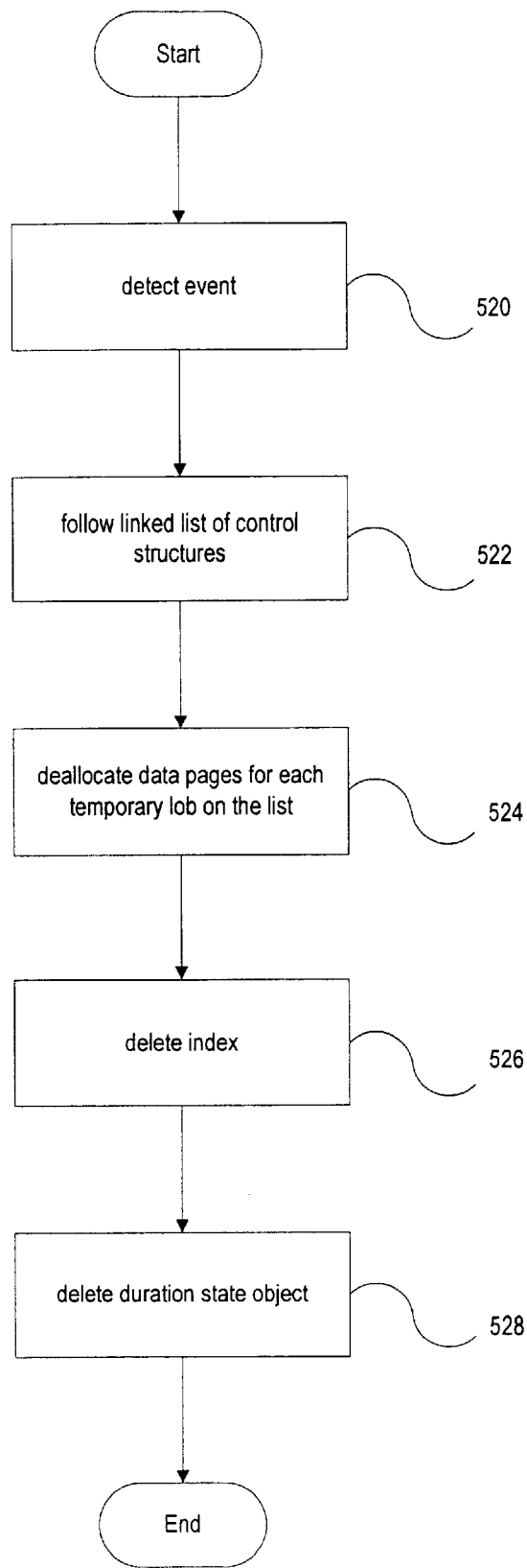
FIG. 6 is a flowchart of an alternate process for deallocating resources associated with a temporary LOB.

FIG. 6 illustrates a flowchart of an alternate process for deallocating the resources of temporary LOBs. This process is used if the temporary LOBs for a duration do not have their resources allocated from a common pool of resources. At process action 520, an event is detected which indicates that a duration is to be terminated. When the event is detected, the linked list of control structures for the temporary LOBs of the duration are followed to find the resources allocated to each temporary LOB (522). The data pages for each temporary LOB are identified, and are thereafter deallocated (524). If the temporary LOBs for the duration are indexed, then the temporary LOB index is deleted (526). Finally, the state object for the duration is removed (528). This includes any elements of the duration state object, such as the linked list of control structures for the duration. In an alternate embodiment, each LOB control structure is released as the process walks the linked list of control structures.

System Architecture Overview

Figure 8:
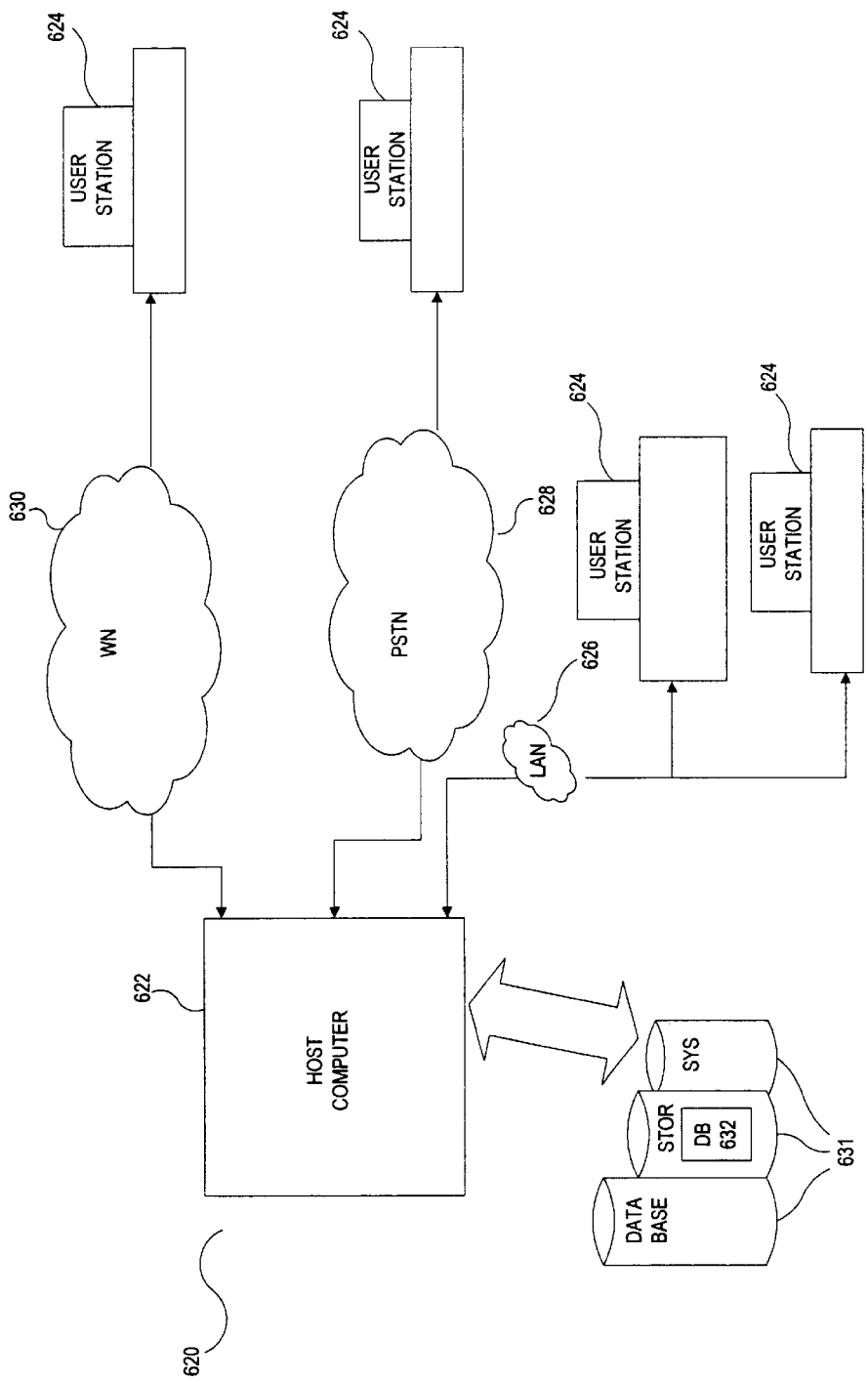
FIG. 8 is a diagram of a computer hardware system with which the present invention can be implemented.

Referring to FIG. 8, in an embodiment, a computer system 620 includes a host computer 622 connected to a plurality of individual user stations 624. In an embodiment, the user stations 624 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 624 are connected to the host computer 622 via a local area network ("LAN") 626. Other user stations 624 are remotely connected to the host computer 622 via a public telephone switched network ("PSTN") 628 and/or a wireless network 630.

In an embodiment, the host computer 622 operates in conjunction with a data storage system 631, wherein the data storage system 631 contains a database 632 that is readily accessible by the host computer 622.

In alternative embodiments, the database 632 may be resident on the host computer, stored, e.g., in the host computer's ROM, PROM, EPROM, or any other memory chip, and/or its hard disk. In yet alternative embodiments, the database 632 may be read by the host computer 622 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 622 can access two or more databases 632, stored in a variety of mediums, as previously discussed.

Figure 9:
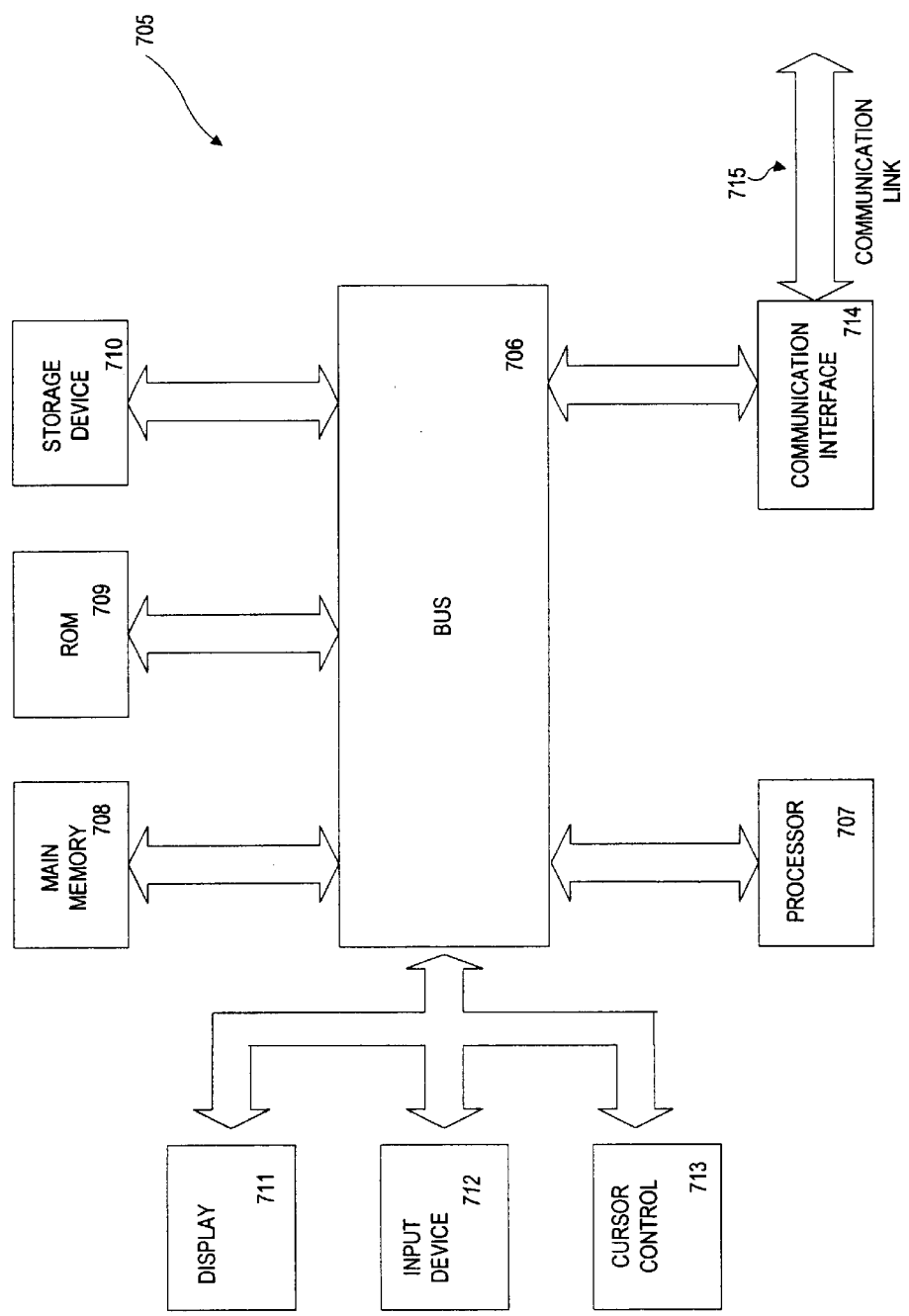
FIG. 9 is an additional diagram of computer hardware system with which the present invention can be implemented.

Referring to FIG. 9, in an embodiment, each user station 624 and the host computer 622, each referred to generally as a processing unit, embodies a general architecture 705. A processing unit includes a bus 706 or other communication mechanism for communicating instructions, messages and data, collectively, information, and one or more processors 707 coupled with the bus 706 for processing information. A processing unit also includes a main memory 708, such as a random access memory (RAM) or other dynamic storage device, coupled to the bus 706 for storing dynamic data and instructions to be executed by the processor(s) 707. The main memory 708 also may be used for storing temporary data, i.e., variables, or other intermediate information during execution of instructions by the processor(s) 707.

A processing unit may further include a read only memory (ROM) 709 or other static storage device coupled to the bus 706 for storing static data and instructions for the processor(s) 707. A storage device 710, such as a magnetic disk or optical disk, may also be provided and coupled to the bus 706 for storing data and instructions for the processor(s) 707.

A processing unit may be coupled via the bus 706 to a display device 711, such as, but not limited to, a cathode ray tube (CRT), for displaying information to a user. An input device 712, including alphanumeric and other keys, is coupled to the bus 706 for communicating information and command selections to the processor(s) 707. Another type of user input device may include a cursor control 713, such as, but not limited to, a mouse, a trackball, a fingerpad, or cursor direction keys, for communicating direction information and command selections to the processor(s) 707 and for controlling cursor movement on the display 711.

According to one embodiment of the invention, the individual processing units perform specific operations by their respective processor(s) 707 executing one or more sequences of one or more instructions contained in the main memory 708. Such instructions may be read into the main memory 708 from another computer-usable medium, such as the ROM 709 or the storage device 710. Execution of the sequences of instructions contained in the main memory 708 causes the processor(s) 707 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 707. Such a medium may take many foors, including, but not limited to, non-volatile, volatile and transmission media. Non-volatile media, i.e., media that can retain information in the absence of power, includes the ROM 709. Volatile media, i.e., media that can not retain information in the absence of power, includes the main memory 708. Transmission media includes coaxial cables, copper wire and fiber optics, including the wires that comprise the bus 706. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 707 can retrieve information.

Various forms of computer-usable media may be involved in providing one or more sequences of one or more instructions to the processor(s) 707 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 706 may receive the infrared signals and place the instructions therein on the bus 706. The bus 706 may carry the instructions to the main memory 708, from which the processor(s) 707 thereafter retrieves and executes the instructions. The instructions received by the main memory 708 may optionally be stored on the storage device 710, either before or after their execution by the processor(s) 707.

Each processing unit may also include a communication interface 714 coupled to the bus 706. The communication interface 714 provides two-way communication between the respective user stations 624 and the host computer 622. The communication interface 714 of a respective processing unit transmits and receives electrical, electromagnetic or optical signals that include data streams representing various types of information, including instructions, messages and data.

A communication link 715 links a respective user station 624 and a host computer 622. The communication link 715 may be a LAN 626, in which case the communication interface 714 may be a LAN card. Alternatively, the communication link 715 may be a PSTN 628, in which case the communication interface 714 may be an integrated services digital network (ISDN) card or a modem. Also, as a further alternative, the communication link 715 may be a wireless network 630.

A processing unit may transmit and receive messages, data, and instructions, including program, i.e., application, code, through its respective communication link 715 and communication interface 714. Received program code may be executed by the respective processor(s) 707 as it is received, and/or stored in the storage device 710, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A process for managing temporary LOBs comprising:
   assigning a temporary LOB to a duration;
   associating a duration end event to said duration;
   allocating resources to said temporary LOB;
   terminating said duration if said duration end event occurs; and
   releasing said resources upon the termination of said duration.

2. The process of claim 1 in which said duration comprises a state object having data structures to track said temporary LOB.

3. The process of claim 2 in which said data structures comprise a linked list of LOB control structures.

4. The process of claim 3 in which said LOB control structures identify the address of said resources and said linked list of LOB control structures is examined to determine the identity of said resources to release.

5. The process of claim 1 in which said resources are allocated from a common set of resources, said common set of resources associated with said duration.

6. The process of claim 5 in which said resources are released by releasing said common set of resources.

7. The process of claim 1 in which said duration end event is based upon a database trigger.

8. The process of claim 1 in which said duration end event is based upon a userselected event.

9. The process of claim 1 in which said duration end event is based upon the state of a user's database activities.

10. A computer program product that includes a medium usable by a processor, the medium having stored thereon a sequence of instructions which, when executed by said processor, causes said processor to execute a process for managing temporary LOBs, said process comprising:

assigning a temporary LOB to a duration;

associating a duration end event to said duration;

allocating resources to said temporary LOB;

terminating said duration if said duration end event occurs; and releasing said resources upon the termination of said duration.

11. A system for managing temporary LOBs, comprising:

means for assigning a temporary LOB to a duration;

means for associating a duration end event to said duration;

means for allocating resources to said temporary LOB;

means for terminating said duration if said duration end event occurs; and means for releasing said resources upon the termination of said duration.

12. The computer program product of claim 10 in which said duration comprises a state object having data structures to track said temporary LOB.

13. The computer program product of claim 10 in which said resources are allocated from a common set of resources, said common set of resources associated with said duration.

14. The computer program product of claim 10 in which said duration end event is based upon a database trigger.

15. The computer program product of claim 10 in which said duration end event is based upon a user-selected event.

16. The computer program product of claim 10 in which said duration end event is based upon the state of a user's database activities.

17. The system of claim 11 in which said duration comprises a state object having data structures to track said temporary LOB.

18. The system of claim 11 in which said resources are allocated from a common set of resources, said common set of resources associated with said duration.

19. The system of claim 11 in which said duration end event is based upon a database trigger.

20. The system of claim 11 in which said duration end event is based upon a user-selected event.

21. The system of claim 11 in which said duration end event is based upon the state of a user's database activities.

\* \* \* \* \*